United States Patent
Rudin et al.

(10) Patent No.: US 9,525,880 B2
(45) Date of Patent: Dec. 20, 2016

(54) LOSSLESS VIDEO DATA COMPRESSOR WITH VERY HIGH DATA RATE

(71) Applicant: Cognitech, Inc., Pasadena, CA (US)

(72) Inventors: Leonid I. Rudin, San Marino, CA (US); Ping Yu, Castaic, CA (US)

(73) Assignee: Cognitech, Inc., Pasadena, CA (US)

( * ) Notice: Subject to any disclaimer, the term of this patent is extended or adjusted under 35 U.S.C. 154(b) by 0 days.

(21) Appl. No.: 14/635,989

(22) Filed: Mar. 2, 2015

(65) Prior Publication Data

US 2015/0172664 A1 Jun. 18, 2015

Related U.S. Application Data

(63) Continuation of application No. 13/567,856, filed on Aug. 6, 2012, now abandoned, which is a continuation of application No. 12/481,207, filed on Jun. 9, 2009, now Pat. No. 8,238,679, which is a continuation of application No. 10/670,415, filed on Sep. 24, 2003, now Pat. No. 7,548,658.

(51) Int. Cl.
| | |
|---|---|
| H04N 19/13 | (2014.01) |
| H04N 19/593 | (2014.01) |
| H04N 19/91 | (2014.01) |
| H04N 19/182 | (2014.01) |
| H04N 19/136 | (2014.01) |
| H04N 19/176 | (2014.01) |

(52) U.S. Cl.
CPC .......... *H04N 19/13* (2014.11); *H04N 19/136* (2014.11); *H04N 19/176* (2014.11); *H04N 19/182* (2014.11); *H04N 19/593* (2014.11); *H04N 19/91* (2014.11)

(58) Field of Classification Search
CPC .......... H04N 7/26244; H04N 7/50; G06T 1/20
USPC .......................... 382/239, 307; 375/240.26
See application file for complete search history.

(56) References Cited

U.S. PATENT DOCUMENTS

| | | |
|---|---|---|
| 2004/0105598 A1 | 6/2004 | Kondo et al. |
| 2004/0202374 A1 | 10/2004 | Venkataraman |
| 2013/0058402 A1 | 3/2013 | Rudin et al. |

OTHER PUBLICATIONS

U.S. Appl. No. 13/567,856, filed Aug. 6, 2012, Leonid I. Rudin, Ping Yu, Office Action dated Aug. 28, 2014.

*Primary Examiner* — Thai Tran
*Assistant Examiner* — Mishawn Hunter
(74) *Attorney, Agent, or Firm* — Klein, O'Neill & Singh, LLP

(57) ABSTRACT

Lossless video data compression is performed in real time at the data rate of incoming real time video data in a process employing a minimum number of computational steps for each video pixel. Each pixel 8-bit byte is converted to a difference byte representing the difference between the pixel and its immediate predecessor in a serialized stream of the pixel bytes. This reduces the dynamic range of the data. Any carry bits generated in the subtraction process of two's complement arithmetic are discarded. This reduces the data by a factor of two. Finally, the 8-bit difference pixel bytes thus produced are subject to a maximum entropy encoding process. Such a maximum entropy encoding process may be referred to as a minimum length encoding process.

14 Claims, 7 Drawing Sheets

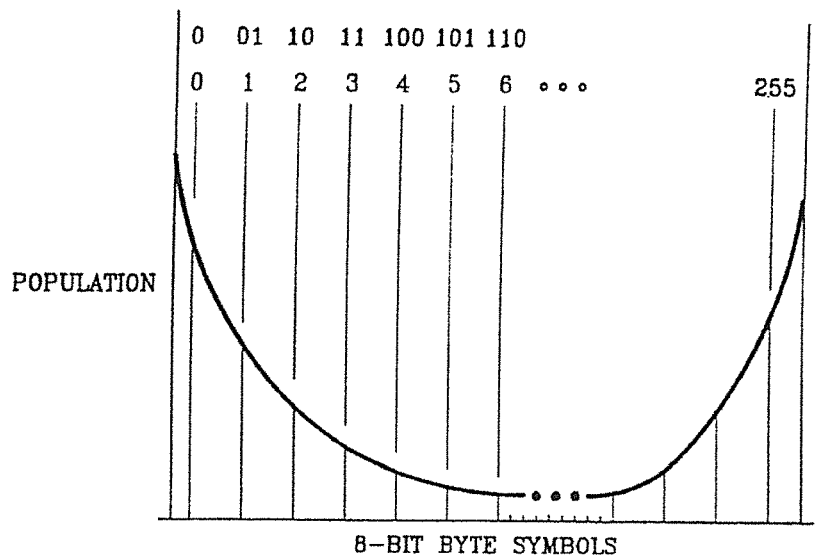
FIG. 6
| PIXEL BYTE | ENCODED SYMBOL |
|---|---|
| 00000000 | 01 |
| 00000001 | 10 |
| 00000010 | 11 |
| ⋮ | ⋮ |
FIG. 7
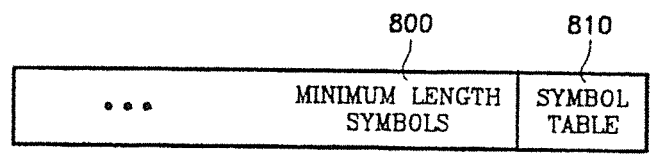
FIG. 8

LOSSLESS VIDEO DATA COMPRESSOR WITH VERY HIGH DATA RATE

CROSS-REFERENCE TO RELATED APPLICATIONS

This application is a continuation of U.S. patent application Ser. No. 13/567,856, filed Aug. 6, 2012, which is a continuation of U.S. patent application Ser. No. 12/481,207, filed Jun. 9, 2009, now U.S. Pat. No. 8,238,679, which is a continuation of U.S. patent application Ser. No. 10/670,415, filed Sep. 24, 2003, now U.S. Pat. No. 7,548,658, the disclosures of which are incorporated by reference herein.

BACKGROUND OF THE INVENTION

The invention concerns the processing of video data for recording on a disk. Video data typically consists of a succession of video frames, each frame consisting of (in the case of NTSC video) 640 columns and 480 rows of picture elements (pixels). Typically, each pixel consists of an eight-bit byte representing the intensity value of the pixel. Video data typically is generated at the rate of 30 frames per second (in the case of NTSC video). In the case of color video, each image consists of three different channels, one channel for each of three primary colors (e.g., red, green and blue). From the foregoing, the data rate of digital color video data is calculated to be about 27 megabytes per second.

Storing video data as it is generated at 30 frames per second is difficult, since the average writing speed of a typical disk is near a range from 10 to 14 megabytes per second, or about half the video data rate. The problem is how to write video data at 27 megabytes per second onto a disk that can be written no faster than half that rate. This problem is solved by either compressing the video data by a factor of two prior to writing to the disk or by sharing the data writing operation among several disks of a disk array. The main disadvantage of compressing the video data by a factor of two is that data compression techniques capable of such a high compression ratio tend to incapable of handling high incoming data rates in real time and, in addition, many such compression techniques are lossy. The main disadvantage of using a disk array is high expense. The present invention is directed to compressing incoming video data at a very high data rate (e.g., 27 megabytes per second) with a compression ratio of about two or more with no loss of image quality.

A conventional lossless video compression process is incapable of handling high speed incoming video data in real time because such a lossless video compression process is typically complex, requiring a relatively large number of computational steps for each pixel. Lossy compression may tend to be simpler in some cases (but not necessarily all cases) because they can employ a smaller number of computational steps for each pixel. The problem is how to perform lossless video compression at high incoming data rates. The problem with a complex lossless compression process at high incoming data rates can be understood with reference to the diagram of FIG. 1A, illustrating the architecture of a typical microprocessor 1. In FIG. 1A, a common data bus 10 is shared by a high speed working memory or random access memory (RAM) 15 and an arithmetic logic unit (ALU) 20. A controller 25 controls the bus 10, the RAM 15 and the ALU 20 to execute successive instructions of a program (stored in the RAM 15, for example) implementing a compression process. For this purpose, incoming uncompressed video data from a camera or VCR 30 is supplied to the bus 10 at an incoming port 35, and compressed video data generated by the process is output on the bus 10 to a disk storage or write device 40 via an outgoing port 45.

Access to the bus by the incoming and outgoing data ports 35, 45 is controlled by the controller 25. Unlike conventional approaches of the prior art, the present invention seeks to store video data from the camera 30 on the disk storage 35 in real time without buffering the video data. In such a case, the compression process performed by the microprocessor 1 must provide a balance between the high data rate of the incoming video data from the camera (e.g., 27 megabytes per second) and the lower data rate at which the disk storage can write data (e.g., less than 10-14 megabytes per second). Specifically, the compression rate of the compression process performed by the microprocessor 1 must be at least as great as the ratio between the incoming video data rate and the write speed of the disk storage 40.

The main problem is that a lossless compression process has too many instructions or operations to perform for each video pixel for the microprocessor to perform at 27 megabytes per second. The reason is that for each arithmetic operation or instruction performed by the ALU 20, a set of intermediate computational results are obtained which must be stored in the RAM 15 to await the computation of other intermediate results in accordance with other instructions or operations, with which they are to be combined in a yet later operation. Since the data bus 10 is shared by the RAM 15 and ALU 20, it limits forces the microprocessor 1 to wait as each intermediate instruction is executed for the results from the ALU 15 to be stored via the bus 10 in the RAM 15 and other results fetched from the RAM 15 via the bus 10 to the ALU 20 for use by the next instruction or operation. Such waiting is necessary to avoid conflicting use of the bus 10, but limits the rate at which the succession of instructions representing the compression process can be performed. As the rate of the incoming (uncompressed) video data is increased, a point is reached at which the processing of the previous video pixel data is still unfinished as the next video pixel data arrives from the camera 30. This occurs well below the real time video data rate of a typical color video camera (27 megabytes per second). One way around this problem is to reduce the number of arithmetic operations performed by the compression process for each video pixel. However, such a reduction leads to a lossy compression process in which image quality of the compressed video data is compromised. In summary, the more complicated compression algorithm will involve more processing steps and each processing step requires getting data from the RAM to and from the ALU or crossing the system bus several times. Since the system bus has limited bandwidth, this can create the processing bottle neck so that the system can not handle the real time data stream.

FIG. 1B illustrates one of the first steps in a standard video compression process, which is to divide each frame 100 of a video image into plural blocks 110 (step 210 of FIG. 2). Then, each block 110 is compressed in a succession of steps, the first of which is to perform a discrete cosine transform on each block (step 220 of FIG. 2). The result is a transformed block consisting of an array of discrete cosine transform coefficients, as illustrated in FIG. 3. These coefficients are encoded using a minimum length encoding scheme, such as a Huffman code (step 230 of FIG. 2). Run length encoding may also be employed (step 240 of FIG. 2). In some video data compressors, the compression ratio is increased by discarding the higher order discrete cosine transform coefficients, namely those on the right side of the diagonal imaginary line of FIG. 3. The remaining coefficients are further quantized to reduce its range. These higher order discrete cosine transform coefficients represent the higher spatial frequencies in the image, corresponding to fine detail features of the image. The discrete cosine transform tends to reduce image quality obtained upon de-compressing the compressed video data, particularly where the higher order discrete cosine transform coefficients are discarded to enhance compression ratio. In addition, blocking artifacts attributable to the division of the video frame into the plural blocks of FIG. 1 and discarding of higher order terms represent a further loss in image quality. However, such trade-offs have been necessary in order to achieve a high compression ratio (such a compression ratio of two or more). Such a reduction of image quality in the video compression process is referred to as lossy video compression.

Heretofore, lossless video compression at a sufficiently high compression rate to balance or compensate in real time for the difference in the data rates of the incoming video signal and the maximum writing speed of a disk storage medium has been unknown. This has presented a fundamental limitation in applications such as forensic image processing, where every image detail must be preserved during image processing. With such a requirement, disk recording of a 30 frame per second video image for forensic purposes, for example, could not be accomplished without use of expensive disk arrays. Therefore, there has been a need for a lossless video compression process having a high compression ratio (e.g., a compression ratio of about two or more).

SUMMARY OF THE INVENTION

In the video compression process of the invention, there is no loss of image quality upon de-compression, while the compression ratio is very high (a compression ratio of two or more) and, significantly, the compression process operates at very high incoming video data rates in real time. This is achieved by a discovery of the invention in which lossless video compression is achieve using a minimal number or arithmetic operations for each pixel. The entire video frame may compressed as a whole or it may be compressed block-by-block. The compression process compresses Incoming video data in real time without requiring data buffering and provides the required balance or compensation between the high incoming video data rate of a video camera and the lower write speed of a disk storage device.

A first step is to convert each pixel 8-bit byte to a difference byte representing the difference between the pixel and its immediate predecessor in a serialized stream of the pixel bytes. Thus, each 8-bit pixel byte is subtracted from its predecessor. This step reduces the dynamic range of the data. A next step is to discard any carry bits generated in the subtraction process of two's complement arithmetic. This reduces the data range by a factor of two. Optionally the 8-bit difference data can be divided into higher order bits part and lower bits part. Run length encoding can be implemented on the higher order bits. Finally, the 8-bit difference pixel bytes (or the remaining lower order bits) thus produced are subject to a maximum entropy encoding process. Such a maximum entropy encoding process may be referred to as a minimum length encoding process. One example is Huffman encoding. In such an encoding process, a code table for the entire video frame is constructed, in which a set of minimum length symbols are correlated to the sec of difference pixel bytes comprising the video frame, the more frequently occurring bytes being assigned to the shorter minimum length symbols. This code table is then employed to convert the all of the difference pixel bytes of the entire video frame to minimum length symbols. A different code table can be constructed for different ones of the successive video frames. The code table contents will depend upon the video frame content. The set of minimum length symbols produced for the current video frame together with the code table generated for the current video frame constitutes one frame of compressed video data. It is this compressed video data that is record onto the disk.

The de-compression process begins by playing back the data recorded on the disk. The playback process is followed by extracting the code table of the current frame using this table to convert the minimum length symbols of the current frame to the corresponding difference pixel bytes. Then, the difference pixel bytes are converted to pixel bytes by adding the previously computed pixel byte to the current difference byte, to generate a stream of pixel bytes from the difference bytes. The stream of pixel bytes constitute the de-compressed video data. The computation of the pixel bytes from the difference bytes inherently restores any information seemingly lost by the discarding of carry bits in the foregoing compression process.

The recovery of the difference bytes from the minimum length symbols in accordance with the minimum length coding table is an exact process without error. The recovery of the pixel bytes from the difference bytes by the foregoing addition step is an exact process and produces the pixel bytes without error or loss. Therefore, the entire compression and decompression cycle is lossless. However, the compression process achieves a compression ratio of two or more. As a result, the compression process is sufficient to record real time (30 frame per second) video data onto a single disk with no loss of information or image quality.

BRIEF DESCRIPTION OF THE DRAWINGS

FIG. 6 illustrates a video frame histogram of the type generated by the apparatus of FIG. 5.

FIG. 7 illustrates a video frame code table of the type generated by the apparatus of FIG. 5.

FIG. 8 illustrates the format of one frame of compressed video data generated by the apparatus of FIG. 5.

DETAILED DESCRIPTION OF THE INVENTION

Compression

Figure 1A:
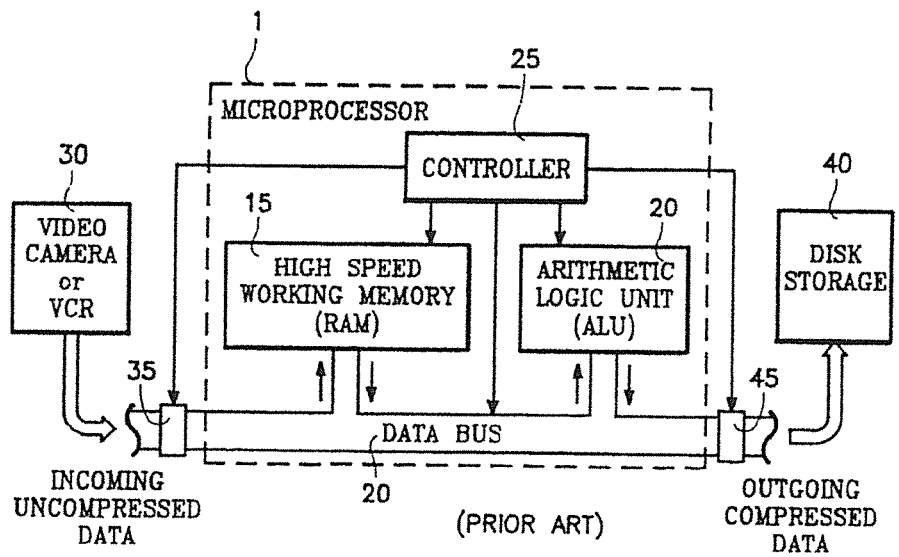
FIG. 1A is a simplified schematic block diagram of a typical microprocessor architecture.
Figure 1B:
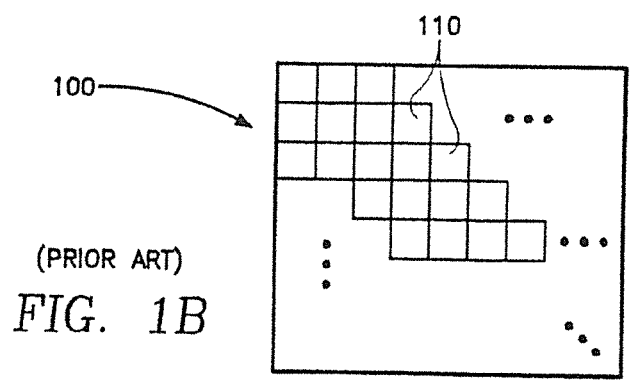
FIG. 1B is a diagram of a video frame of picture elements in accordance with the prior art.
Figure 2:
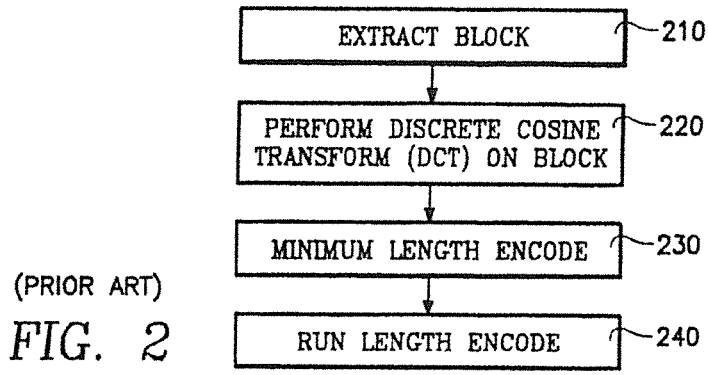
FIG. 2 depicts a video compression process in accordance with the prior art.
Figure 3:
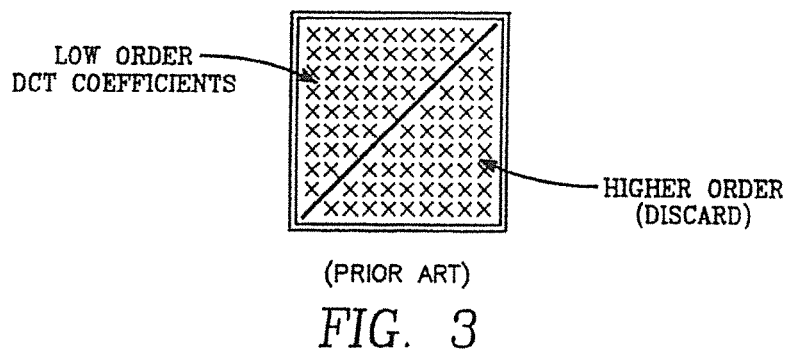
FIG. 3 depicts the discarding of higher order discrete cosine transform coefficients in the prior art process of FIG. 2.
Figure 4:
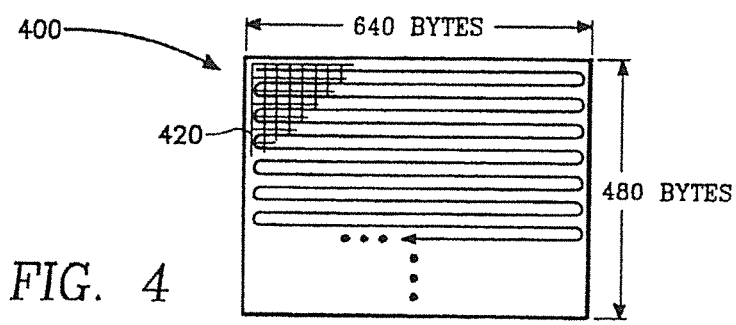
FIG. 4 is a diagram illustrating the serialization of the picture elements of an entire video frame in accordance with the present invention.

Referring to FIG. 4, each individual frame 400 is a two-dimensional array of picture elements ("pixels") 420, the picture elements 420 being arranged in rows and columns of pixels. Following analog-to-digital conversion of the video frame, each pixel is represented by a byte, such as an 8-bit byte, so that the digital representation of a video frame is a two dimensional array of 8-bit bytes corresponding to the array of pixels 420 of FIG. 4, for example. Such bytes may be referred to as "video pixel bytes". Each pixel byte represents the intensity of the corresponding pixel. Hereinafter, the term "video frame" shall refer to the array of video pixel bytes. If the video frame was derived from an NTSC video signal, then the video frame has 640 columns and 480 rows of video pixel bytes corresponding to the array of pixels 420 of FIG. 4. Hereinafter, the pixels 420 of FIG. 4 shall be considered herein as synonymous with video pixel bytes. If the video frame represents a color video signal, then each frame actually consists of three video frames, one for red, one for green and one for blue. In the following digital video processes described below, the same process is performed on each of the red, green and blue video frames representing one color video frame.

In order to digitally process the video data, each video frame 400 is serialized by extracting individual pixels (video pixel bytes) 420 one at a time on a row-by-row basis. FIG. 4 illustrates one way of performing this, in which the extraction pattern is a serpentine path through the rows and column of video pixels 420 of the frame 400. In the following compression process, the video data is compressed on a frame-by-frame basis (rather than dividing each video frame in to blocks and compressing it on a block-by-block basis as was done in the prior art).

Figure 5:
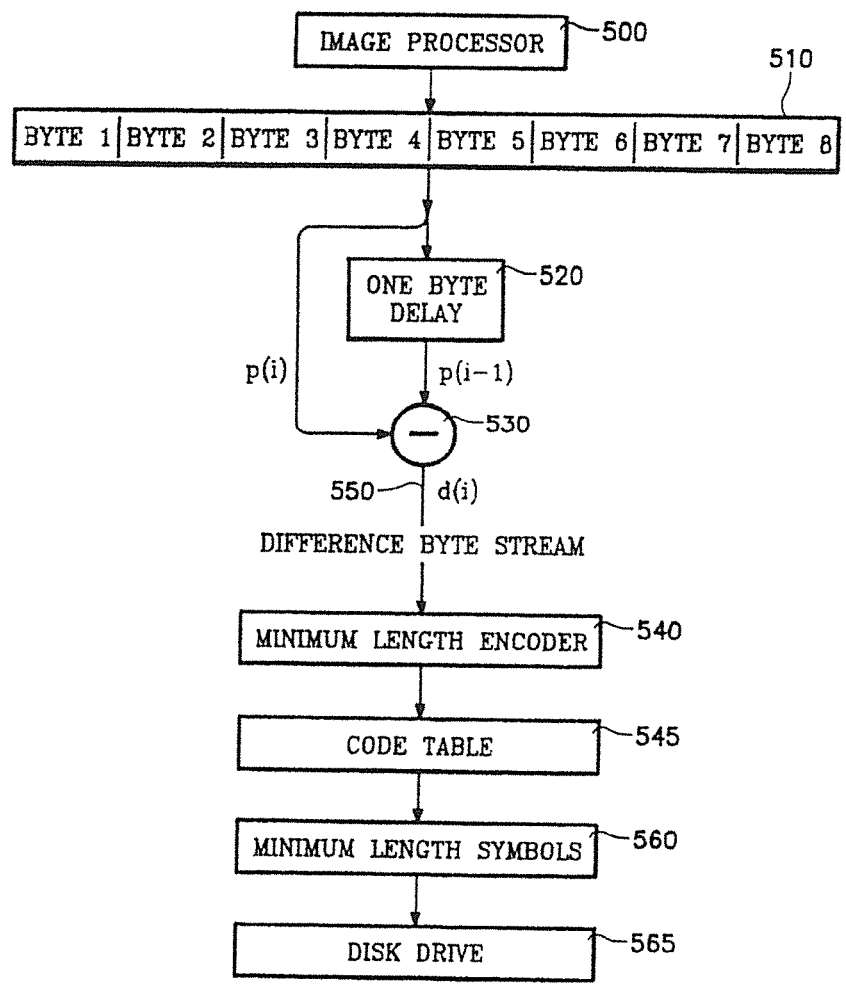
FIG. 5 illustrates a video compression apparatus in accordance with one aspect of the invention.

FIG. 5 illustrates the architecture of a video compression apparatus in accordance with one aspect of the invention. Referring to FIG. 5, an image processor 500 performs the foregoing row-by-row extraction of video pixel bytes to produce a serial stream 510 of the video pixel bytes 420 of the video frame 400. The serial byte stream 510 is fed to a one-byte delay buffer 520. A binary subtracter 530 has a first input connected to the input of the byte delay buffer 520 (so as to receive the current byte of the stream 510 directly) and a second input connected to the output of the byte delay buffer 520 (so as to receive the previous byte of the stream 510). The subtracter 530 therefore produces the difference between each current pixel byte p(i) and its predecessor pixel byte p(i−1), the result being a difference byte d(i). If the difference byte d(i) happens to be a negative number, the two's-complement arithmetic employed in the binary subtracter 530 produces an extra bit or carry bit, corresponding to a sign bit. If the two pixel bytes p(i) and p(i−1) being subtracted are 8-bit bytes, then the extra bit is a ninth bit. In the invention, this extra bit is discarded in order to greatly enhance the compression ratio. It will be shown that this discarding does not result in any loss of information when the compression and decompression processes as a whole are taken into account. The subtracter 530 thus produces a stream 550 of difference bytes d(i) in place of the stream of pixel bytes p(i) representing the current video frame. One advantage of thus converting the pixel byte stream to a stream of difference bytes is that the differencing process reduces the dynamic range of the video data, thus enhancing the ultimate compression ratio.

The stream of difference bytes d(i) of the entire video frame 400 can treated as a single set of bytes, which shall be referred to as a "frame set" of difference bytes. Alternatively, the stream of difference bytes d(i) of the frame 400 may be divided into blocks, in which case each block is a "frame set" in the following description. The frame set of difference bytes is subjected to a minimum length (maximum entropy) encoding process, such as Huffman encoding. In such a process, an encoder 540 constructs a histogram of the difference bytes of the frame set of difference bytes, and ranks each of the bytes in accordance with its frequency of occurrence in the frame set.

Alternatively, the encoder 540 may divide each difference byte d(i) into a higher order bit portion and a lower order bit portion, and rank only the higher order bit portions. In this alternative mode, the steps carried out in encoding the higher order bit portions are the same as those described below for the entire difference byte, except that the number of bits is one half the full difference byte. In this alternative mode, the lower order bit portions are not encoded by the encoder 540 but are simply carried separately through the process and written to the storage medium. Or, in a yet further alternative mode, they may be encoded separately by the encoder 540 in the manner described below.

Figure 9:
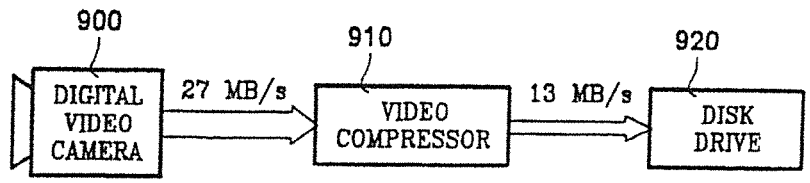
FIG. 9 illustrates a video system incorporating the compression apparatus of FIG. 5.

A typical histogram generated by the encoder 540 is illustrated in the graph of FIG. 6, in which the horizontal axis corresponds to the difference byte symbols while the vertical axis corresponds to the frequency of occurrence or population of these symbols in the current video frame. For example, if the pixel bytes are each 8-bits, then there are 256 different bytes that must be ranked (some of whose frequency of occurrence may be zero). From this ranking, the encoder 540 constructs a code table 545 associating the most frequently occurring bytes in the current video frame with the shortest symbols in a set of minimum length symbols. The code table therefore reflects the contents of the entire video frame or frame set of difference bytes. An example of such a code table is illustrated in FIG. 7, in which the left-hand column lists the n-bit bytes in order of their population in the current video frame while the right-hand column lists the corresponding encoded symbols in order of symbol length (from the shortest to the longest symbols). After the code table has been constructed, the encoder 540 uses this code table to replace each difference byte d(i) in the difference byte stream 550 with the corresponding minimum length symbol specified in the code table. This produces a stream 560 of minimum length symbols representing the current video frame. The stream compressed video data for one video frame is illustrated in FIG. 8, and consists of a stream of minimum length symbols 800 of the current video frame together with the code table 810 of the current video frame. It is the compressed video data of FIG. 8 that is written onto a disk drive 565. FIG. 9 illustrates a system in which a digital video camera 900 produces a frame of video data. A compressor 910 corresponding to the compression apparatus of FIG. 5 compresses the video data, the compressed video data being written to a disk memory 920.

Figure 10:
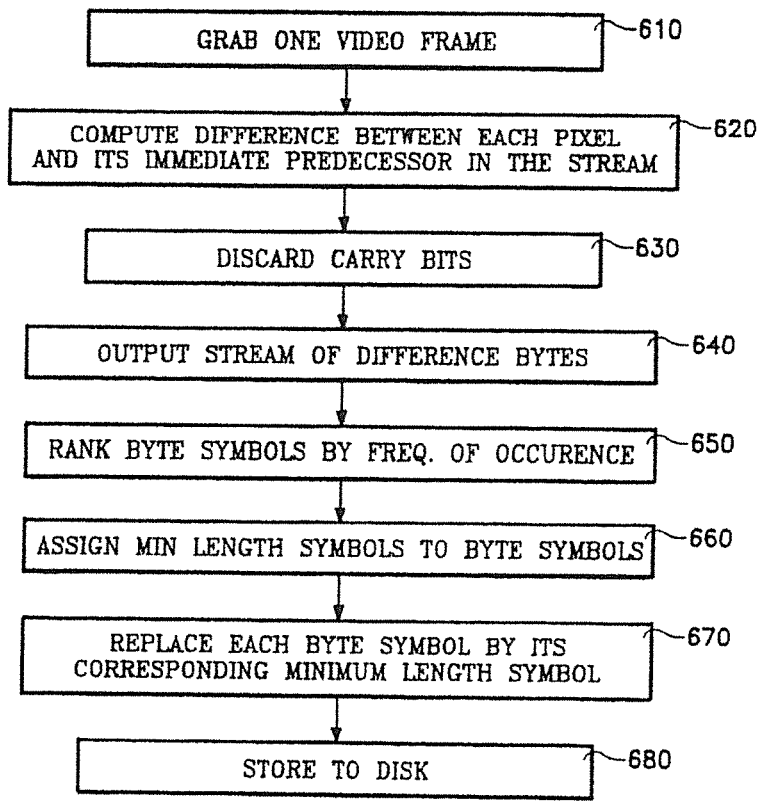
FIG. 10 is a diagram illustrating a video compression process performed by the apparatus of FIG. 5.

The foregoing compression process is illustrated in the flow diagram of FIG. 10. The first step (block 610 of FIG. 10) is to access a current frame of video data and serialize is as illustrated in FIG. 4. Then, for each pixel byte, a difference byte is computed by subtracting the pixel byte from the preceding pixel byte in the pixel byte stream (block 620). Next, any carry bits generated in the subtraction step of block 620 are discarded (block 630). Thus, a stream of difference bytes is produced all having the same number of bits (block 640). Each of the byte symbols is ranked against all other byte symbols in accordance with the frequency of its occurrence in the frame set of difference bytes corresponding to the current video frame (block 650). The ranked symbols are then assigned to respective minimum length symbols of a predetermined set of minimum length symbols, the shorter minimum length symbols being assigned to the more frequently occurring byte symbols (block 660). If the bytes contain eight bits, then there are 256 symbols to be ranked in this manner. Each difference byte of the current video frame is then replaced by a minimum length symbol in accordance with the code table (block 670), and the resulting stream of minimum length symbols for the current video frame are then stored on a disk or in a memory together with code table of the current video frame (block 680). It is the stream of minimum length symbols together with the code table that constitutes the compressed video data.

The compression ratio achieved in the foregoing compression process is about two. The compression ratio may be defined as the ratio between the number of bits per video frame of the raw video data and the number of bits per video-frame of the compressed video data. As discussed earlier in this specification, uncompressed color video data consisting of 8-bit pixel bytes at 30 frames per second has a data rate of about 27 megabytes per second, while the write speed of a typical disk drive is about half that rate. The present Invention provides a compression rate of two with no loss of information. Therefore, the invention provides compressed video data that can be recorded in real time onto a single digital disk drive at 30 frames per second without loss of information or image quality.

Decompression

Figure 11:
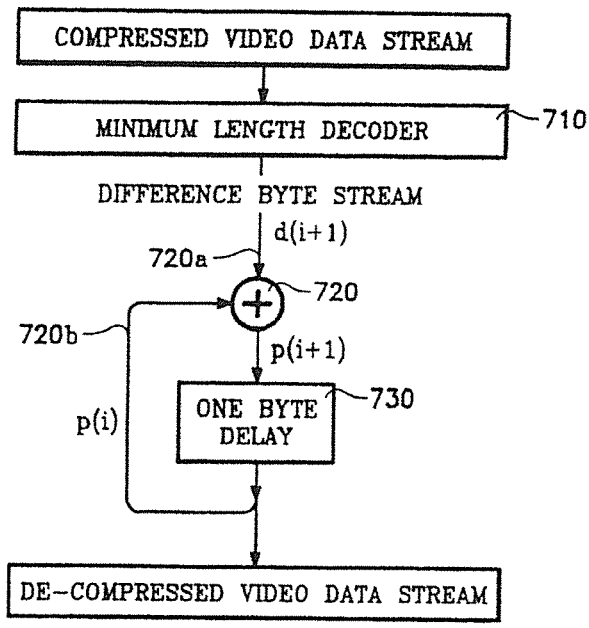
FIG. 11 illustrates a video decompression apparatus in accordance with another aspect of the invention.

FIG. 11 illustrates the architecture of a video decompression apparatus in accordance with another aspect of the invention. The video data was compressed by the compression apparatus of FIG. 5 on a per-frame basis as described above. Therefore, the decompression apparatus of FIG. 11 decompresses the compressed video data on a per frame basis as well.

A minimum length decoder 710 extracts the code table from the compressed video data along with the minimum length symbols corresponding to the current compressed video frame. The decoder 710 converts each of the minimum length symbols to the corresponding difference bytes in accordance with the extracted code table. This produces the stream of difference bytes d(i+1) that was originally generated by the compression apparatus of FIG. 5.

In order to convert the stream of difference bytes d(i+1) to a stream of the original pixel bytes p(i+1), an adder 720 and a one-byte delay buffer 730 are employed. The adder 720 is an n-bit adder, where n is the number of bits per pixel byte. One input 720*a* of the adder 720 receives the stream of difference bytes d(i+1) one byte at a time.

The other input 720*b* of the adder 720 receives the output of the one-byte delay buffer 730. The output of the adder 720 is applied to the input: of the one-byte delay buffer 730. At a given sample time i+1, the adder input 720*a* receives the difference byte d(i+1) while the other adder input 720*b* receives the pixel byte p(i) produced at the adder output during the previous sample time i. As a result, the adder 720 produces the current pixel byte p(i+1) during the current sample time i+1. This implements the definition of the current pixel byte p(i+1) in terms of the current difference byte d(i+1) and the previous pixel byte p(i): p(i+1)=d(i+1)+p(i). The stream of pixel bytes produced at the output of the buffer 730 is the decompressed video data.

Figure 12:
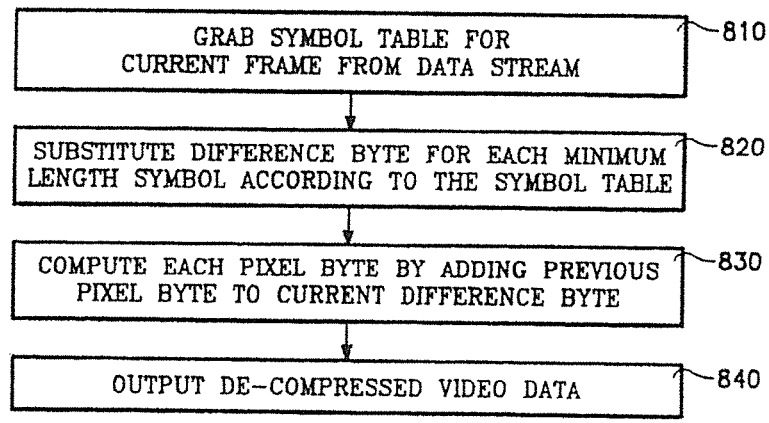
FIG. 12 is a diagram illustrating a video decompression process carried out by the apparatus of FIG. 11.

The process performed by the decompression apparatus of FIG. 11 is illustrated in FIG. 12. First, the minimum length decoder 710 grabs the code table and the difference bytes of the current video frame from the compressed video data stream (block 810 of FIG. 11). Then, the decoder 710 substitutes for each minimum length symbol a corresponding one of the n-bit difference pixels in accordance with the code table (block 820). This produces a stream of difference bytes. The adder 720 and the delay buffer 730 then compute each pixel byte by adding the present difference byte to the pixel byte computed for the previous sample time (block 830). The result is a stream of pixel bytes of the current video frame, which constitutes the decompressed video data.

The decompressed video data thus produced is an exact replica of the original video data constituting the video frame of FIG. 4. This is because there is no loss of information in the entropy encoding performed by the minimum length encoder 540 and no loss in the differencing process performed by the buffer 520 and subtracter 530 of the compression apparatus of FIG. 5.

Figure 13:
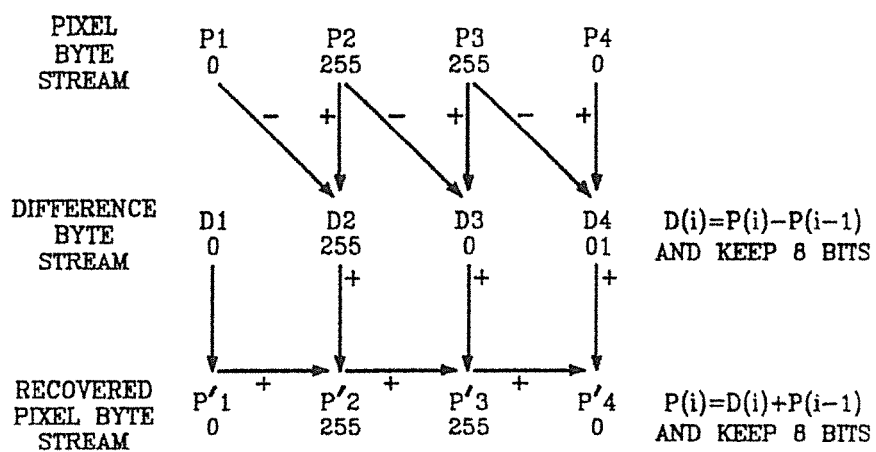
FIG. 13 is a diagram illustrating the transformation of an exemplary pixel byte stream into a difference byte stream in the compression process of FIG. 10 and the transformation of the difference byte stream into a pixel byte stream in the decompression process of FIG. 12.

FIG. 13 illustrates how the extra carry bit produced during the differencing process (of the video compressor of FIG. 5) can be discarded with no loss of information, to achieve a large gain in compression ratio. In the diagram of FIG. 13, a sequence of four pixel bytes is labeled P1, P2, P3 and P4. In the example depicted, their respective values vary between the minimum and maximum values of an 8-bit byte, and are P1=0, P2=255, P3=255 and P4=0. The corresponding row in the diagram of FIG. 13 is labeled appropriately Pixel Byte Stream. The next row is labeled Difference Byte Stream, and consists of a sequence of four difference bytes labeled D1, D2, D3 and D4 corresponding to the four pixel bytes. Each difference byte is the difference between the corresponding pixel byte and its predecessor. Thus, the diagram of FIG. 13 shows how D2 is computed from P2 and P1, D3 is computed from P3 and P2, and so forth. P1 has no predecessor, so that D1 is equal to P1. The result is that D1=0, D2=255, D3=0 and D4=1, provided that all carry bits generated in the two's complement subtraction process are discarded in accordance with the invention. The last row is labeled Recovered Pixel Byte, in which the recovered pixel bytes are labeled P'1 through P'4. The diagram of FIG. 13 shows that each recovered pixel byte is determined by the sum of its predecessor and the current difference byte. In the present example, this sum produces the following values: P'1=0, P'2=255, P'3=255 and P'4=0, which are identical to the original values for P1, P2, P3 and P4. Therefore, discarding of the carry bits in the subtraction process did not cause any loss of information. One advantage of the feature or the invention in which the carry bit is discarded is that the dynamic range of the data is reduced by a factor of two (since each bit represents a respective power of two in the binary numbering system). This reduction in dynamic range provides a corresponding increase in compression ratio for the entire compression process of FIG. 10.

As described above, each difference byte may be computed as the difference between a current byte and a proceeding byte in the data stream. In one embodiment, the preceding byte is a byte immediately preceding the current byte. Thus, the pair bytes may correspond to adjacent pixels in the same frame, for example, or they could be spaced apart (not adjacent). However, each difference byte may be computed differently. For example, the preceding byte may be from a different frame. In this case, the pair of bytes may be the same frame location (i.e., the same pixel location in the two different frames). Or, they may be different locations in the two frames, but they may correspond to the same location in a moving image. One way of correlating pixels between two frames of a moving image is described in U.S. Pat. No. 5,909,251, issued on Jun. 1, 1999 to Leonid Rudin and Frederic Guichand and assigned to the present assignee.

While the invention has been described in detail by specific reference to preferred embodiments, it is understood that variations and modifications thereof may be made without departing from the true spirit and scope of the invention.

What is claimed is:

1. A method using a computer of processing a video signal, said video signal including a stream of pixel values representing intensity of pixels of successive video frames, each of said video frames corresponding to a two-dimensional array of pixels, said method comprising:
   converting said stream of pixel values into a stream of difference values by performing a subtraction between each pixel value and a preceding pixel value in said stream, and ignoring a carry bit with respect to the difference values carry bit generated by performing said subtraction;
   performing a maximum entropy encoding process on the difference values on a block by block basis;
   the maximum entropy process including replacing difference values with corresponding characters in accordance with a code table for each block, so as to produce a stream of characters comprising a losslessly compressed version of said video signal;
   wherein the subtraction between each pixel value and a preceding pixel value are for pixels in difference frames.

2. The method of claim 1 further comprising writing said stream of characters and the corresponding code table for each block.

3. The method of claim 2 further comprising retrieving said stream of characters and said code table for each block.

4. The method of claim 3 further comprising:
   converting each of said characters to a corresponding difference value in accordance with said code table for each block;
   computing from each of said difference bytes a corresponding pixel value by adding a current one of the difference bytes and a pixel byte computed from a preceding one of the difference bytes.

5. The method of claim 1 wherein said code table corresponds to a Huffman code table.

6. The method of claim 1, wherein the pixels in different frames are in the same frame location.

7. The method of claim 1, wherein the pixels in different frames are in different frame locations.

8. The method of claim 7, wherein the different frame locations correspond to the same location in a moving image.

9. A method using a computer of processing a video signal comprised of a stream of pixel intensity values, comprising:
   for each pixel intensity value, determining a difference between the pixel intensity value and another pixel intensity value;
   performing a maximum entropy encoding process on the differences between pixel intensity values to obtain symbols of reduced length for the differences between pixel intensity values; and
   storing in memory the symbols of reduced length for the differences between pixel intensity values and a table resulting from the maximum entropy encoding process;
   wherein the differences between pixel intensity values is determined by subtracting one pixel intensity value from another pixel intensity value, and discarding a carry bit.

10. The method of claim 9, wherein the symbols are minimum length symbols.

11. The method of claim 9, wherein determining the difference between the pixel intensity value and the other pixel intensity value comprises determining the difference between a pixel intensity value for a pixel in a first frame and a pixel intensity value for a pixel in a second frame, the first frame and the second frame being different frames.

12. The method of claim 11, wherein a location of the pixel in the first frame and a location of the pixel in the second frame are different locations.

13. The method of claim 12, wherein the different locations correspond to the same location in a memory image.

14. The method of claim 9, wherein the symbols obtained by the maximum entropy encoding process for frequently occurring differences between pixel intensity values are smaller than symbols obtained by the maximum entropy encoding process for less frequently occurring differences between pixel intensity values.

* * * * *